Feb. 11, 1969    W. A. PLUMMER    3,427,392
PRESSURIZABLE CABLE SPLICE ASSEMBLY
Filed Nov. 14, 1966
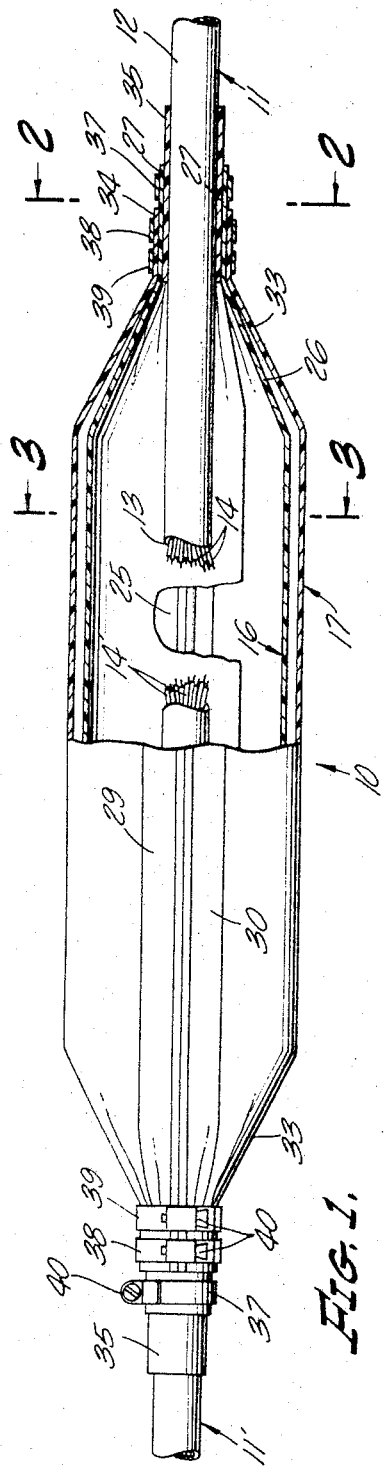
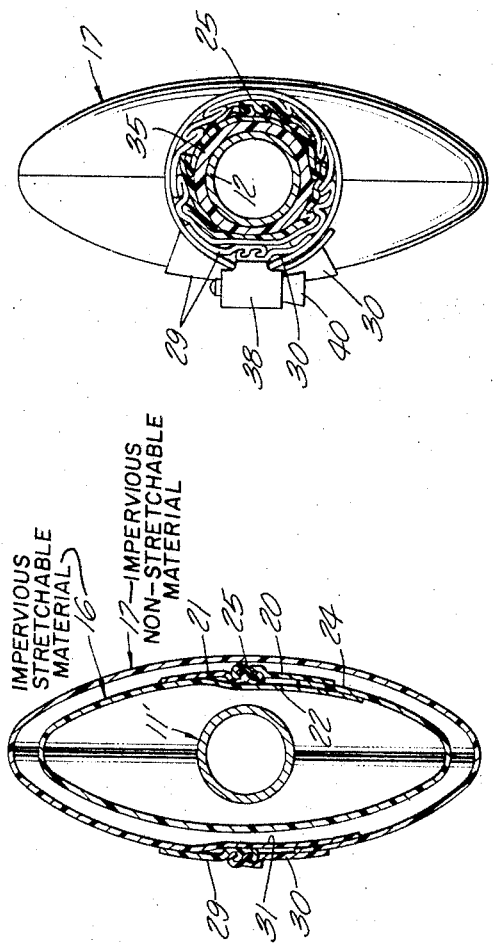
WALTER A. PLUMMER
INVENTOR.
BY
ATTORNEYS

United States Patent Office

3,427,392
Patented Feb. 11, 1969

3,427,392
PRESSURIZABLE CABLE SPLICE ASSEMBLY
Walter A. Plummer, 3546 Crownridge Drive,
Sherman Oaks, Calif. 91403
Filed Nov. 14, 1966, Ser. No. 593,862
U.S. Cl. 174—21                  7 Claims
Int. Cl. H02g *15/24;* H01b *17/00*

ABSTRACT OF THE DISCLOSURE

A single-use jacket assembly comprising one and preferably a pair of independent jackets of flexible sheet material each provided with a longitudinal seam bridged interiorly by a pressure-activated guard flap. The inner jacket is inflatable to the limit permitted by the outer stronger jacket. The seams permit assembly of each jacket about a cable splice between working periods and are sealed closed following which the jacket ends are clamped in a fluid-tight manner to the cable sheath. Pressurization takes place by leakage of pressurized gas from the cable into the temporary jacketing to raise the internal pressure and prevent leakage of moisture into the jacket undergoing splicing. The inexpensive jacketing assembly is adapted to be destroyed during removal.

---

This invention relates to cable splices and more particularly to a temporary protector for enclosing partially completed cable splices between working periods and featuring a protector capable of being pressurized during interruptions in the splicing operation to safeguard the cable against the entry of moisture and contaminants.

It is a common expedient to maintain telephone communication and power cables under internal pressure with dry clean air or gas in order to safeguard against the entry of moisture and contaminants of various kinds. During opening of the cable sheaths to permit of splicing, leakage of the pressurized gas is unavoidable and the loss is compensated in part by introducing additional pressurized gas at spaced points along the cable. During interruptions in the cable splicing operations as between working shifts, it is most important that the splice area be enclosed with a suitable boot of moisture-proof protective material. However, heretofore no satisfactory boot has been available capable of maintaining the splice zone pressurized between working periods.

It is a primary purpose of the present invention to overcome the aforementioned deficiencies and to provide an inexpensive easily-installed protective jacketing for enclosing a splice operation readily adapted to be pressurized after installation using pressurized gas leaking into the inner jacket of the assembly from the cable itself. Inasmuch as the normal operating pressure within such cables may be as high as 10 p.s.i., it is important that the protective jacketing be specially constructed to withstand such pressures. If not so constructed, the jacketing will burst and permit rain water, snow and moisture generally to enter with resulting risk of serious damage to the cable.

It is, therefore, a primary object of the present invention to provide a protective jacketing assembly which can be used to enclose a splice operation between different stages of the splicing and adequate to withstand the pressure of the cable system. To this end the invention assembly comprises an inner tubular jacket of flexible resilient material including a strong seam capable of being closed and sealed. Surrounding this inner jacket is an outer jacket of flexible, high-strength non-stretchable material capable of restraining and limiting the expansion of the stretchable inner jacket as the latter expands under the cable gas pressure. The concentrically related jackets include provision for clamping the opposite ends against the cable sheath in an airtight and fluid-tight manner.

It is, therefore, a primary object of the present invention to provide an improved method and jacketing assembly adapted to be installed about a cable splice quickly and with a minimum of effort to provide an enclosing assembly capable of withstanding the internal gas pressure customarily present in cables.

Another object of the invention is the provision of an improved pressurized temporary cable jacket capable of preventing the entry of moisture and foreign matter to the interior of the cable between inactive stages of a splicing operation.

Another object of the invention is the provision of an improved method of temporarily enclosing a cable splice with a moisture-proof, gas-proof, and vapor-proof enclosure and effective to maintain the interior of jacket pressurized with dry gas and to exclude moisture even though the jacket may be submerged in liquid.

Another object of the invention is the provision of a novel method of preventing entry of moisture and foreign material into a cable undergoing splicing by enclosing the splice area with an internal stretchable but vapor-proof jacketing assembly enclosed by an outer stronger longitudinally seamed restraining jacket.

These and other more specific objects will appear upon reading the following specification and claims and upon considering in connection therewith the attached drawing to which they relate.

Referring now to the drawing in which preferred embodiment of the invention is illustrated.

FIGURE 1 is a longitudinal view partly in section showing a preferred embodiment of the invention jacketing assembly fully installed about a cable splice;

FIGURE 2 is a cross-sectional view taken along line 2—2 on FIGURE 1; and

FIGURE 3 is a cross-sectional view taken along line 3—3 on FIGURE 1.

Referring initially more particularly to FIGURE 1, there is shown one preferred embodiment of the invention jacketing assembly, designated generally 10, installed about a lead sheathed telephone cable 11. The sheath 12 of the cable has been severed and cut away at 13 to expose conductors 14 to the end that selected ones thereof can be spliced together or to conductors of a branchout cable not shown. Jacketing assembly 10 includes an inner tubular jacket 16 of impervious stretchable material and an outer jacket 17 of impervious non-stretchable material capable of restraining the inflation of the inner jacket 16.

In a typical construction, inner jacket 16 is made of heavy gauge poly vinyl chloride sheet plastic material having a pronounced stretch or elastic characteristic. The jacket is formed from an elongated strip of such sheet material sufficiently wide to enclose the splice zone and the bulky ends of the conductors undergoing splicing. Heat-fused or otherwise firmly bonded to the opposite lateral edge portions of this strip are two extruded interlocking seam forming members 20, 21. Any suitable fluid-tight interlocking seam construction can be employed although that shown in my Patent 2,960,561 granted Nov. 1, 1960, is typical and eminently satisfactory in meeting the objectives of the present invention. Desirably, one of the tapes, as 21, is heat fused to the jacket along an area spaced inwardly from its lateral edge to provide a guard flap 22 sufficiently wide to fully bridge the jacket seam. This guard flap avoids the possibility of wires undergoing splicing interfering with the closure of the seam. Additionally, gas pressure which builds up interiorly of the assembled jacket 16 serves to press the guard flap against the interior of the seam and the adjacent portion 24 of the main body of the jacket thereby forming a highly effective fluid seal supplementing the sealing action of the seam proper 25.

In a typical case, the main bodies of both jackets 16 and 17 are tubular throughout the major portion of their length with their opposite ends heat fused together along converging paths at their opposite sides to form a conical section 26 at either end merging with a short cylindrical section having a diameter closely approximating that of the cable sheath.

Outer jacket 17 is fabricated in the same general manner as jacket 16 using high strength flexible sheet material such as nylon fabric heavily impregnated with sheet poly vinyl chloride. Accordingly, the main body of the outer jacket is not stretchable and is adequately strong to withstand an internal gas pressure at least as high as 10 p.s.i. The outer jacket has the same general contour as the inner jacket and is likewise provided with a longitudinal seam formed by a pair of seam-forming tapes 29, 30 likewise of extruded plastic material and having the same type of interlocking tongues and grooves as the seam for jacket 16. Also the mounting webs of these tapes are heat-fused to the jacket in the same manner described above so as to provide a guard flap 31 similar in construction and purpose to guard flap 22. Also the opposite ends of the outer jacket are tailored to provide conical sections 33, 33 preferably terminating at their smaller ends in short cylindrical sections 34.

To assemble the described jacketing assembly about a cable splice junction, the crewmen preferably first wrap the cable sheath snugly with a gummy strip of uncured butyl mastic tape 35. These strips are placed to either side of the splice and at a distance apart corresponding to the length of the two jackets 16 and 17 between their smaller diameter ends. This having been accomplished, the crewman then proceeds to open the seam for the inner jacket and to place it about the splice area taking care to insert the guard flap 22 beneath the interlocking tapes 20, 21. Interlocking tongues and grooves of the seam 25 are then pressed together by finger pressure or by the aid of a suitable closing tool or device well known to this art. If desired, another wrapping of the mastic tape is applied about the cylindrical end portions 27 of the inner jacket or, in the alternative, the outer jacket 17 may be assembled about the inner jacket in this same manner just described for jacket 16.

Thereafter, a plurality of hose clamps 37, 38, 39 are assembled about the opposite ends of the jacketing. As herein shown, a single clamp 37 is applied about the exposed outer ends of the inner jacket and a pair of clamps 38, 39 are assembled about the opposite ends of the outer jacket. Each of these clamps includes an adjustable clamping bolt, as 40, which can be rotated to place the clamps under high tension to compress the underlying layers of the jacketing and of the mastic to the cable sheath in an air-tight manner. Desirably, during the closure of each of the interlocking seams, a plastic solvent material is applied to the interengaging surfaces of the seam with the result that when they are pressed together the solvent-softened surfaces bond together providing further assurance against fluid leakage therepast. Only the inner seam may be so treated under normal circumstances but if the jacketing is to be left assembled for a protracted period of time, a sealing agent is also preferably applied to the interlocking surfaces of the other seam.

Once the seams and clamps have been fully assembled, the pressurized gas leaking toward the splice from the pressurized gas source becomes trapped within inner jacket 16 and gradually increases the pressure therein. As the gas pressure rises, the inner jacket becomes inflated and assumes a cylindrical configuration and stretches into contact with the inner surface of the outer jacket. Since the outer jacket is made of high-strength non-stretchable material, no further stretching occurs and the two jackets cooperate in retaining the dry air under pressure captive within the cable.

When the splicer is ready to resume the splicing operation, the several clamps are loosened and removed following which the seam of the outer jacket is opened and this jacket is removed. If the seam of the inner jacket has been fused closed, it is usually necessary to destroy this jacket in order to gain access to the splice wires. However, this jacket is very inexpensive and is replaced with a new one when it is again desired to terminate the splicing operation until a later working period.

While the particular pressurizable cable splice assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A temporary jacket assembly adapted to be inflated with pressurized gaseous fluid to exclude moisture and contaminants after assembly about a cable splice for electrical conductors, said jacket assembly comprising inner and outer jackets of flexible fluid-tight non-metallic material each having fluid-tight interlocking seam-forming means extending from end-to-end thereof and adapted to be closed in a fluid-tight manner after each jacket as been assembled about a cable splice, means including resilient gasketing material for clamping the opposite ends of said inner and outer jackets to the sheaths of cables being spliced together, the inner one of said jackets being expandable against the outer jacket and incapable of reliably withstanding the internal cable gas pressure and the outer jacket being sufficiently strong to limit expansion of said inner inflatable jacket.

2. A jacket assembly as defined in claim 1 characterized in that said inner jacket comprises a long tubular body formed of stretchable sheet material.

3. A jacket assembly as defined in claim 1 characterized in that said outer jacket comprises a long tubular body of high strength fabric impregnated with a fluid-tight flexible coating.

4. A jacket assembly as defined in claim 1 characterized in that the fluid-tight seam-forming means for said inner and outer jackets are disposed along the remotely spaced sides of said jackets.

5. A jacket assembly as defined in claim 1 characterized in that said gasketing means includes soft mastic tape tacky to the touch wrapped snugly about the cable sheathing and underlying the adjacent ends of said inner and outer jackets, and said clamping means comprising contractable clamps encircling said gasketing and the ends of said inner and outer jackets and operable to constrict and clamp the same against cable sheathing under very substantial pressure adequate to prevent leakage of pressurized fluid outwardly therepast from within said inner jacket.

6. That method of excluding moisture from sheathed communication cables between stages of a splicing operation which method comprises, wrapping a cable sheath to either side of a splicing operation with spongy resilient gasketing, applying a longitudinally seamed jacket having a stretchable impervious main body about said splice and bonding the seam thereof closed with the ends of said inner jacket snugly embracing said gasketing, applying a longitudinally-seamed outer jacket of flexible high-strength non-stretchable material about and sized to limit the inflation of said first mentioned jacket, closing the seam of said outer jacket, clamping both ends of said jackets to said sheathing and to the gasketing wrapped thereabout to provide a fluid-tight joint between the cable sheathing and said jackets, and inflating the inner one of said jackets against said outer jacket to place the splice under fluid pressure to preclude the entry of moisture into said splice.

7. That method of excluding moisture and foreign matter from a sheathed cable having a plurality of conductors therein between stages of a splicing operation which method comprises, applying resilient gasketing about a cable sheath to either side of a splicing operation, applying a longitudinally seamed jacket of flexible impervious fiber-reinforced sheet material having sufficient burst strength to withstand an internal gas pressure of several p.s.i. about the portion of the cable between said gasketing with its ends embracing the gasketing, bridging said seam along the interior side thereof with a wide guard flap of flexible impervious material adapted to be pressed in sealing contact with the interior surface of the jacket along the opposite sides of said seam by the internal gas pressure sealing said seam closed, sealing said gasketing and the ends of said jacket against the juxtaposed portions of the cable, and pressurizing the interior of said sealed jacket with dry gas to hold the lateral edge portions of said guard flap in sealing contact with the juxtaposed interior surfaces of said jacket and to exclude moisture and foreign matter even though the jacketed portion of the cable is submerged in several feet of liquid.

References Cited

UNITED STATES PATENTS

| | | | |
|---|---|---|---|
| 2,050,888 | 8/1936 | Kirch | 174—11 |
| 2,967,795 | 1/1961 | Bollmeier et al. | 174—76 X |
| 3,054,849 | 9/1962 | Colbert | 174—5 X |
| 3,175,032 | 3/1965 | Strauss | 174—93 |
| 3,187,090 | 6/1965 | Edwards | 174—92 X |
| 3,209,061 | 9/1965 | Mier et al. | 174—138 X |
| 3,268,654 | 8/1966 | Morrison et al. | 174—138 |

LEWIS H. MYERS, *Primary Examiner.*

A. T. GRIMLEY, JR., *Assistant Examiner.*

U.S. Cl. X.R.

174—138